United States Patent
Sun et al.

(10) Patent No.: US 8,670,211 B1
(45) Date of Patent: Mar. 11, 2014

(54) METHOD AND SYSTEM FOR PROVIDING HIGH MAGNETIC FLUX SATURATION COFE FILMS

(75) Inventors: Ming Sun, Pleasanton, CA (US); Jose A. Medina, Pleasanton, CA (US); Keith Y. Sasaki, San Jose, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 71 days.

(21) Appl. No.: 13/164,991

(22) Filed: Jun. 21, 2011

Related U.S. Application Data

(60) Continuation-in-part of application No. 11/962,470, filed on Dec. 21, 2007, which is a division of application No. 10/815,494, filed on Mar. 31, 2004, now Pat. No. 7,333,295.

(51) Int. Cl.
*G11B 5/127* (2006.01)
*C25D 3/00* (2006.01)

(52) U.S. Cl.
USPC ......... 360/125.01; 205/119; 205/96; 205/255

(58) Field of Classification Search
USPC ........ 360/125.01, 125.03; 205/82, 84, 90, 96, 205/104, 119, 255; 29/603.13; 427/132
See application file for complete search history.

(56) References Cited

U.S. PATENT DOCUMENTS

| | | | |
|---|---|---|---|
| 4,053,373 A | 10/1977 | McMullen et al. | |
| 6,090,269 A | 7/2000 | Mandler et al. | |
| 6,132,892 A | 10/2000 | Yoshikawa et al. | |
| 6,183,889 B1 | 2/2001 | Koshiba et al. | |
| 6,678,125 B2 | 1/2004 | Nikitin et al. | |
| 6,778,358 B1 | 8/2004 | Jiang et al. | |
| 6,855,240 B2 | 2/2005 | Cooper et al. | |
| 7,177,117 B1 | 2/2007 | Jiang et al. | |
| 7,333,295 B1 | 2/2008 | Medina et al. | |
| 7,354,664 B1 | 4/2008 | Jiang et al. | |
| 2002/0155321 A1 | 10/2002 | Kawasaki et al. | |
| 2003/0044303 A1 | 3/2003 | Chen et al. | |
| 2003/0048582 A1 | 3/2003 | Kanada et al. | |
| 2003/0085131 A1 | 5/2003 | Li et al. | |
| 2003/0095357 A1 | 5/2003 | Kudo et al. | |
| 2004/0101712 A1 | 5/2004 | Kudo et al. | |

FOREIGN PATENT DOCUMENTS

JP 2002-134318 A 5/2002

OTHER PUBLICATIONS

Medina et al., "Magnetic Properties of Electroplated CoNiFe Alloys," from K2-Seventh International Symposium on Magnetic Mterials, Processes and Devices, Oct. 22, 2002, p. 1.

*Primary Examiner* — Will J Klimowicz

(57) ABSTRACT

A method and system plates CoFeX, where X is an insertion metal. The method and system include providing a plating solution including hydroxymethyl-p-tolylsulfone (HPT). The plating solution being configured to provide a CoFeX film having a high saturation magnetic flux density of greater than 2.3 Tesla and not more than 3 weight percent of X. The method and system also include plating the CoFeX film on a substrate in the plating solution. In some aspects, the plated CoFeX film may be used in structures such as main poles of a magnetic recording head.

16 Claims, 4 Drawing Sheets

150

152 — Provide Plating Solution Including Hydroxymethyl-p-tolylsulfone and Configured to Plate a High Saturation Magnetic Flux Density, Low Coercivity CoFeX Film Having Not More Than 3 Weight Percent X 154 — Plate CoFeX Using Plating Solution

METHOD AND SYSTEM FOR PROVIDING HIGH MAGNETIC FLUX SATURATION COFE FILMS

CROSS-REFERENCE TO RELATED APPLICATIONS

This application is a Continuation-in-Part of co-pending U.S. patent application Ser. No. 11/962,470, filed Dec. 21, 2007, assigned to the assignee of the present application, which is a divisional of U.S. patent application Ser. No. 10/815,494 filed on Mar. 31, 2004 now issued as U.S. Pat. No. 7,333,295, assigned to the assignee of the present application.

BACKGROUND

FIG. 1 depicts a conventional write head 10, which is typically incorporated into a merged head (not shown) including the conventional write head 10 and a conventional read head (not shown). The conventional write head includes a conventional first pole (P1) 20, a conventional write coil 30 insulated by insulating layer 32, a conventional write gap 40, and a conventional second pole (P2) 50. The conventional P1 20 and the conventional P2 50 are separated by the conventional write gap 40 in the region of the pole tip. The conventional P1 20 and the conventional P2 50 are typically composed of ferromagnetic materials. The write coil 30 is used to carry a current which energizes P1 20 and P2 50 during writing. The insulating layer 32 is typically a hardbaked photoresist.

In order to improve the ability of the conventional write head 10 to write to higher density media (not shown), it is desirable for at least a portion of the conventional P1 20 and the conventional P2 50 have a high saturation magnetic flux density ($B_{sat}$) and a low coercivity. A material can be considered to have high $B_{sat}$ when the $B_{sat}$ is above 2 Tesla. A material can be considered to be soft, having a low coercivity, when the coercivity is less than approximately thirty Oe. To fabricate such high $B_{sat}$, soft ferromagnetic materials, the P1 20 and P2 50 are typically plated. A variety of soft ferromagnetic materials having the high $B_{sat}$ have been explored for use in poles such as P1 20 and P2 50. In particular, CoFe and CoNiFe have been investigated. Bulk CoFe having high $B_{sat}$, values of up to 2.4 T have been reported. However, CoFe alloys may have a higher coercivity. In addition, the CoFe are subject to corrosion, which is undesirable for conventional write heads 10. Further, the properties of bulk materials, such as CoFe, may differ from the properties of thin films of these materials as used in devices such magnetic recording heads. Plated CoNiFe has been investigated. For example, references discuss plating of CoNiFe in a variety of solutions, including those containing hydroxymethyl-p-tolylsulfone. However, there is no indication that CoNiFe having both sufficiently high $B_{sat}$ and the desired softness have been obtained.

Accordingly, what is needed is a system and method for obtaining material(s) that may be suitable for use in write heads. The present invention addresses such a need.

BRIEF SUMMARY OF THE INVENTION

A method and system for plating CoFeX, where X is an insertion metal, are described. The method and system include providing a plating solution including hydroxymethyl-p-tolylsulfone (HPT). The plating solution is configured to provide a CoFeX film having a high saturation magnetic flux density of greater than 2.3 Tesla and not more than 3 weight percent of X. The method and system also include plating the CoFeX film on a substrate in the plating solution. In some aspects, the plated CoFeX film may be used in structures such as main poles of a magnetic recording head.

DETAILED DESCRIPTION OF THE EMBODIMENTS OF THE INVENTION

The method and system described herein relate to an improvement in magnetic recording technology. The following description is presented to enable one of ordinary skill in the art to make and use the method and system and is provided in the context of a patent application and its requirements. Various modifications to the preferred embodiment will be readily apparent to those skilled in the art and the principles herein may be applied to other embodiments. Thus, the method and system are not intended to be limited to the embodiments shown, but is to be accorded the widest scope consistent with the principles and features described herein.

In one aspect, the method and system are used in plating CoNiFe. The method and system include providing a plating solution including hydroxymethyl-p-tolylsulfone and plating the CoNiFe film on a substrate in the plating solution. The plating solution is configured to provide a CoNiFe film having a high saturation magnetic flux density and having a composition of fifty through seventy weight percent of Fe and three through eight weight percent of Ni. In another aspect, the method and system include plating at least a portion of a first and/or second pole of a write head using the plating solution including hydroxymethyl-p-tolylsulfone and configured to plate the CoNiFe film having a high saturation magnetic flux density and a composition of fifty through seventy weight percent of Fe and three through eight weight percent of Ni.

The method and system are described in terms of particular properties for CoNiFe and CoFeX films. However, one of ordinary skill in the art will readily recognize that the method and system can be used to provide CoNiFe and CoFeX films having other properties not inconsistent with the present invention. The method and system are also described in the context of particular constituents and particular concentrations of constituents in the plating solution, such as hydroxymethyl-p-tolylsulfone. However, one of ordinary skill in the art will readily recognize that other and/or additional constituents other concentrations not inconsistent with the method and system. The method and system are also described in the context of a write head. However, one of ordinary skill in the art will readily recognize that the write head may be incorporated into a merged head and that the CoNiFe and CoFeX films may be used for other purposes. Furthermore, one of ordinary skill in the art will readily recognize that the figures herein are for the purposes of illustration only and thus are not drawn to scale.

Figure 1:
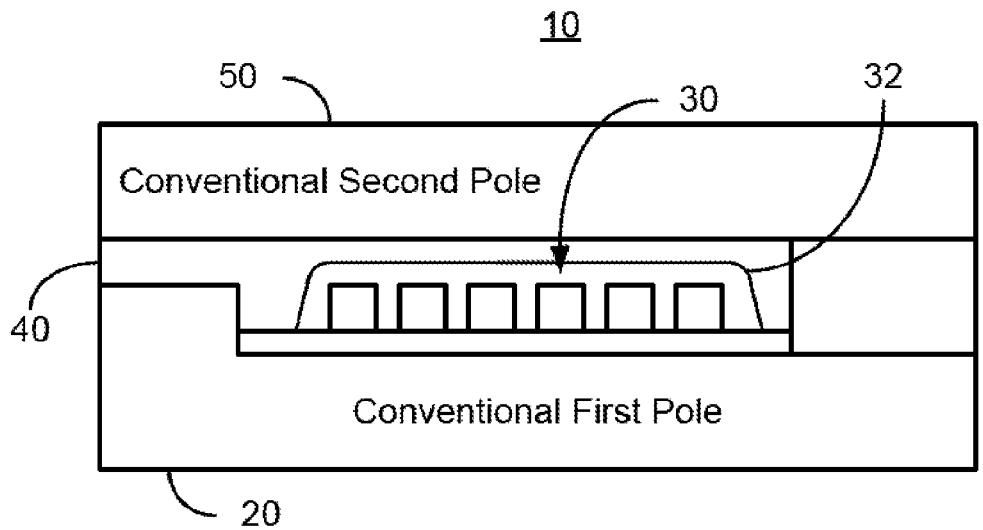
FIG. 1 is a diagram of a conventional magnetic write head formed using conventional materials.
Figure 2:
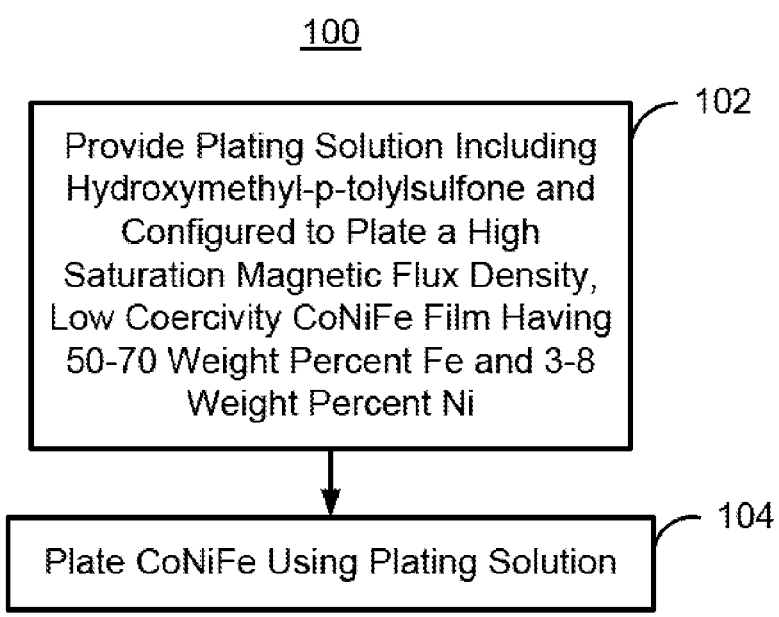
FIG. 2 is a flow chart depicting an exemplary embodiment of a method for providing a plated CoNiFe film.

To more particularly illustrate one aspect of the method and system, refer now to FIG. 2, depicting one embodiment of a method 100 in accordance with the present invention for providing a plated CoNiFe film. The method 100 is preferably used in plating CoNiFe for write heads. However, the method 100 may be used in plating CoNiFe for other purposes.

A plating solution including hydroxymethyl-p-tolylsulfone (HPT) is provided, via step 102. The plating solution is configured to provide a CoNiFe film having a high saturation magnetic flux density ($B_{sat}$) and having a composition of fifty through seventy weight percent of Fe and three through eight weight percent of Ni. As used herein, a high $B_{sat}$ is greater than or equal to two Tesla. In a preferred embodiment, the plating solution is configured to plate a CoNiFe film having a composition of fifty-eight through sixty-two weight percent of Fe and three and a half to four weight percent of Ni. Also in a preferred embodiment, the plating solution is configured such that the resulting CoNiFe film is soft. As used herein, a soft film has a coercivity of less than thirty Oe. In a preferred embodiment, the plating solution is also configured to provide a CoNiFe film having a low perpendicular anisotropy field ($H_k$). As used herein, a low $H_k$ is less than approximately forty Oe. In order to provide the CoNiFe films described above, the plating solution preferably includes $CoSO_4$, $NiSO_4$, $FeSO_4$, $NH_4Cl$, boric acid, Sodium lauryl sulfate, and saccharin in addition to hydroxymethyl-p-tolylsulfone. Moreover, step 102 preferably includes maintaining the plating solution at a pH of less than three and preferably substantially 2.8. However, in another embodiment a pH of three to five may be maintained. Step 102 also preferably includes maintaining the plating solution at a desired temperature, for example approximately eighteen degrees Celsius.

A CoNiFe film having the desired properties is plated on a substrate in the plating solution, via step 104. Step 104 continues until a CoNiFe having the desired thickness is achieved. In a preferred embodiment, the CoNiFe film is being plated for a write head (not shown in FIG. 2). In such an embodiment, the substrate includes the structures under the first and/or second pole.

Using the method 100, a CoNiFe film having the desired composition and magnetic properties can be provided. In a preferred embodiment, the CoNiFe film has a composition of fifty-eight through sixty-two weight percent of Fe and three and a half through four weight percent of Ni. In such an embodiment, a high $B_{sat}$ of greater than 2.2 Tesla may be achieved form some compositions. The CoNiFe film is also soft. In the preferred embodiment, the plated CoNiFe film has a hard axis coercivity of less than or equal to two Oe, an easy axis coercivity of less than or equal to six Oe and the preferred composition described above. Thus, the CoNiFe film plated using the method 100 is suitable for use in a write head. Moreover, the CoNiFe may have better corrosion resistance than CoFe. Note, however, that the CoNiFe plated using the method 100 may not have corrosion resistance as high as other CoNiFe films. In a preferred embodiment, the method 100 also produces a low plated CoNiFe film having a low $H_k$ of less than approximately thirty-five Oe.

Figure 3:
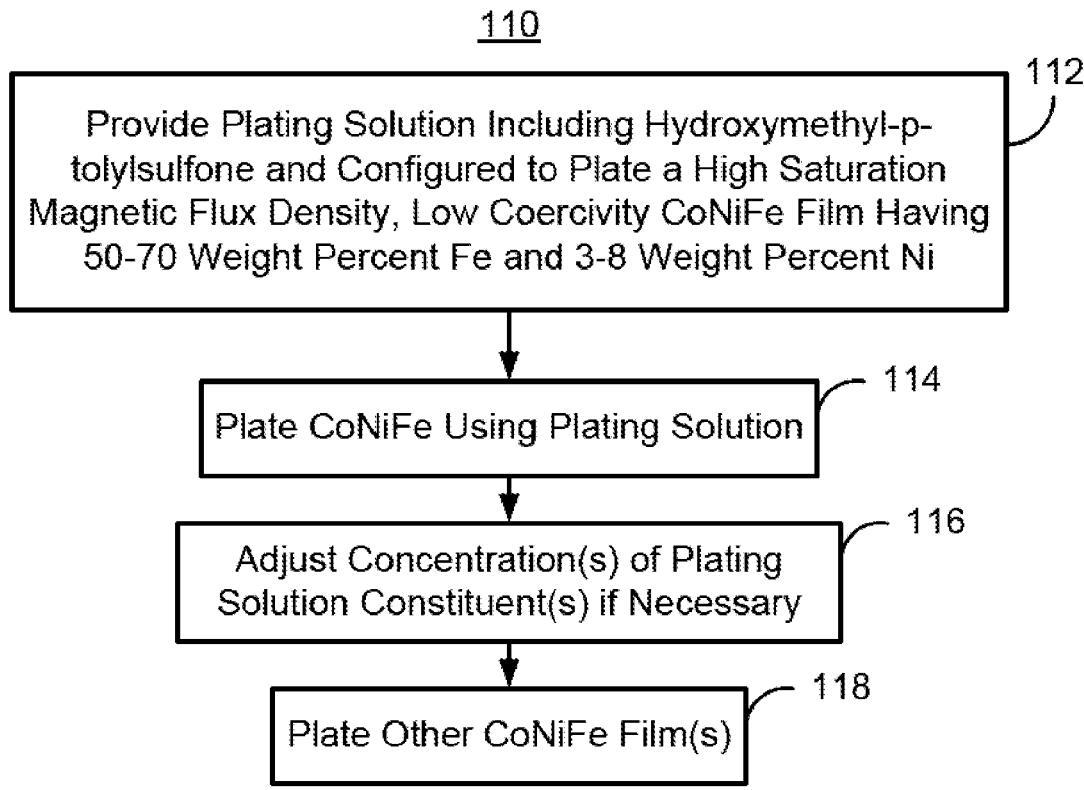
FIG. 3 is a flow chart depicting another exemplary embodiment of a method for providing a plated CoNiFe film.

FIG. 3 is a more detailed flow chart of one embodiment of a method 110 for plating high $B_{sat}$, soft CoNiFe films in accordance with the present invention. An initial plating solution including HPT is provided, via step 112. The plating solution provided in step 112 is analogous to the plating solution provided using step 102 of the method 100. Thus, the plating solution is configured to plate a high $B_{sat}$, preferably soft CoNiFe film that preferably also has a low $H_k$. In a preferred embodiment, the initial composition of the plating solution is: fifteen g/l $CoSO_4$ $7H_2O$, twenty-two to thirty g/l $NiSO_4$ $6H_2O$, zero to forty-five g/l $FeSO_4$ $7H_2O$, fifteen g/l $NH_4Cl$, twenty g/l boric acid, 0.01 g/l sodium lauryl sulfate, 0.1 g/l saccharin, and 0.005-0.025 g/l hydroxymethyl-p-tolylsulfone. Also in a preferred embodiment step 112 includes maintaining the plating solution at a pH of approximately 2.8 and a temperature of approximately eighteen degrees Celsius.

A CoNiFe film is plated on a substrate in the plating solution, via step 114. In a preferred embodiment, the CoNiFe film is being plated for a write head (not shown in FIG. 3). In such an embodiment, the substrate includes the structures under the first and/or second pole. Moreover, step 114 is continued until the desired thickness of CoNiFe film is achieved.

The concentration of constituents in the plating solution is adjusted to maintain the plating of the CoNiFe film having the desired composition, the desired $B_{sat}$, and preferably the desired softness and $H_k$, via step 116. Thus, once one or more films have been plated in step 114, the plating solution is tuned so that the plating solution will still be configured to provide CoNiFe films having the desired properties. At least one more CoNiFe film is plated using the updated plating solution, via step 118. In a preferred embodiment, the conditions under which the CoNiFe film is plated in step 118 are substantially the same as for the CoNiFe film plated in step 114.

Using the method 110, CoNiFe films having the desired composition, magnetic properties, and other properties can be obtained. In a preferred embodiment, the CoNiFe films have a composition of fifty-eight through sixty-two weight percent of Fe and three and a half through four weight percent of Ni. In such an embodiment, a high $B_{sat}$ of greater than 2.2 Tesla may be achieved form some compositions. The CoNiFe films plated using the method 110 are also preferably soft. In the preferred embodiment, the plated CoNiFe film has a hard axis coercivity of less than or equal to two Oe, an easy axis coercivity of less than or equal to six Oe. In one embodiment, the method 100 also produces a low plated CoNiFe film having a low $H_k$ of less than approximately thirty-five Oe. In a preferred embodiment, the plated CoNiFe film has a low $H_k$ of less than approximately twenty Oe. Moreover, the CoNiFe may have better corrosion resistance than CoFe. Note, however, that the CoNiFe plated using the method 110 may not have corrosion resistance as high as other CoNiFe films.

Although the methods 100 and 110 function, other soft, high $B_{sat}$ CoFe-based films are also desired to be fabricated. In current generation heads, $B_{sat}$ of greater than 2.3 T may be desired. However, such high $B_{sat}$ may be difficult or impossible to achieve for CoNiFe films. Consequently, other materials are desired to be investigated. For example, CoFeX films, where X is an additive for the alloy such as an insertion metal, are desired to be fabricated. X may be as low as zero and as high as three weight percent. The insertion metal used for X may be one or more of: Ni, Rh, Cr, Ru, Pt, Pd, and Mn. Thus, a method for providing such films, particularly for use in magnetic recording write transducers is desired.

Figure 4:
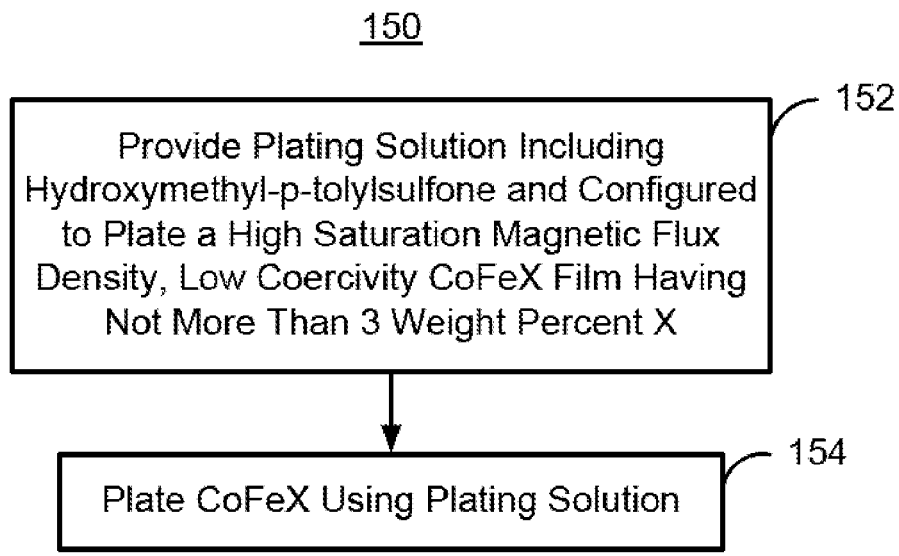
FIG. 4 is a flow chart depicting an exemplary embodiment of a method for providing a plated CoFeX film.

FIG. 4 depicts an exemplary embodiment of a method 150 for providing a plated CoFeX film. In some embodiments, X is an insertion metal such as Ni, Rh, Cr, Ru, Pt, Pd, and/or Mn. Such insertion metals may be used to tailor properties of the CoFeX film, such as the magnetic properties, the stress and/or the grain size. The method 150 may be used in plating CoFeX for write heads. For simplicity, some steps may be omitted, combined, and/or interleaved. In addition, the steps of the method 150 may include substeps. The method 150 is also described in the context of providing a single film. However, the method 150 may be used to fabricate multiple films and/or a film for multiple transducers at substantially the same time. The method 150 may also be used in plating CoFeX for other purposes.

A plating solution including HPT and configured for plating a high $B_{sat}$, soft CoFeX film is provided, via step 152. The plating solution is configured to provide a CoFeX film having a high saturation magnetic flux density ($B_{sat}$) of greater than 2.3 Tesla and having a composition of no more than three weight percent of X. In some embodiments, therefore, X may be omitted. In some embodiments, the plating solution is also configured such that the resulting CoFeX film is soft. Configuring the plating solution in step 152 includes setting a concentration of the HPT. In some embodiments, this concentration is at least 0.001 grams per liter and not more than 0.1 grams per liter. In other embodiments, the concentration of HPT is at least 0.005 grams per liter and not more than 0.025 grams per liter. In order to provide the CoFeX films, the plating solution may include $CoSO_4$, $FeSO_4$, NaCl, boric acid, and sodium lauryl sulfate in addition to HPT. However, other salts for plating CoFeX may be used. For example, a mechanism for introducing X into the film and/or other salts may be used for providing Co and/or Fe in the film. Moreover, step 152 may include maintaining the plating solution at a pH of less than three and at least two. The pH of the solution may be maintained by diluting the solution with $H_2SO4$. Step 152 may also include maintaining the plating solution at a desired temperature, for example approximately eighteen degrees Celsius (i.e. room temperature).

A CoFeX film having the desired properties is plated on a substrate in the plating solution, via step 154. In a preferred embodiment, the CoFeX film is being plated for a write head. In such an embodiment, the substrate includes the structures under the first and/or second pole. In some embodiments, step 154 includes plating the CoFeX film using a direct current. For example, in some embodiments, a direct current of at least two and not more than six milliAmperes per square centimeter is used. In other embodiments step 154 includes plating the CoFeX film using a pulsed current. Step 154 continues until a CoFeX having the desired thickness is achieved. For example, in some embodiments, plating is terminated when the CoFeX film has a thickness of at least 0.1 micron and not more than two microns. In some embodiments, the CoFeX is at least 0.2 micron and not more than 0.8 micron. The CoFeX film may be desired to be not more than two microns in thickness to aid in preventing delamination of the film.

Thus, a CoFeX film is plated in steps 154. In some embodiments, the CoFeX film provided includes at least fifty-five and not more than eighty weight percent of Fe. In some such embodiments, the CoFeX film includes at least sixty and not more than sixty five weight percent Fe. The CoFeX film plated in step 154 may also have a high $B_{sat}$. In some embodiments, the $B_{sat}$ is at least 2.35 T. In some such embodiments, the $B_{sat}$ is at least 2.37. In other embodiments, the $B_{sat}$ is at least 2.4 T. The value of X is zero in some embodiments. For example, for a $B_{sat}$ of greater than 2.35 T, X may be omitted. The CoFeX film plated in step 154 may also be soft. For example, the CoFeX film as plated may have a hard axis coercivity of less than or equal to two Oe and an easy axis coercivity of less than or equal to six Oe. The CoFeX film may also have a lower $H_k$.

Using the method 150, a CoFeX film having the desired composition and magnetic properties can be provided. The CoFeX film may have a high $B_{sat}$, of up to 2.35-2.4 T or greater. The CoFeX film is also soft. Thus, the method 150 may be used to provide a CoFeX film that is suitable for use in current and future generation magnetic recording devices.

Figure 5:
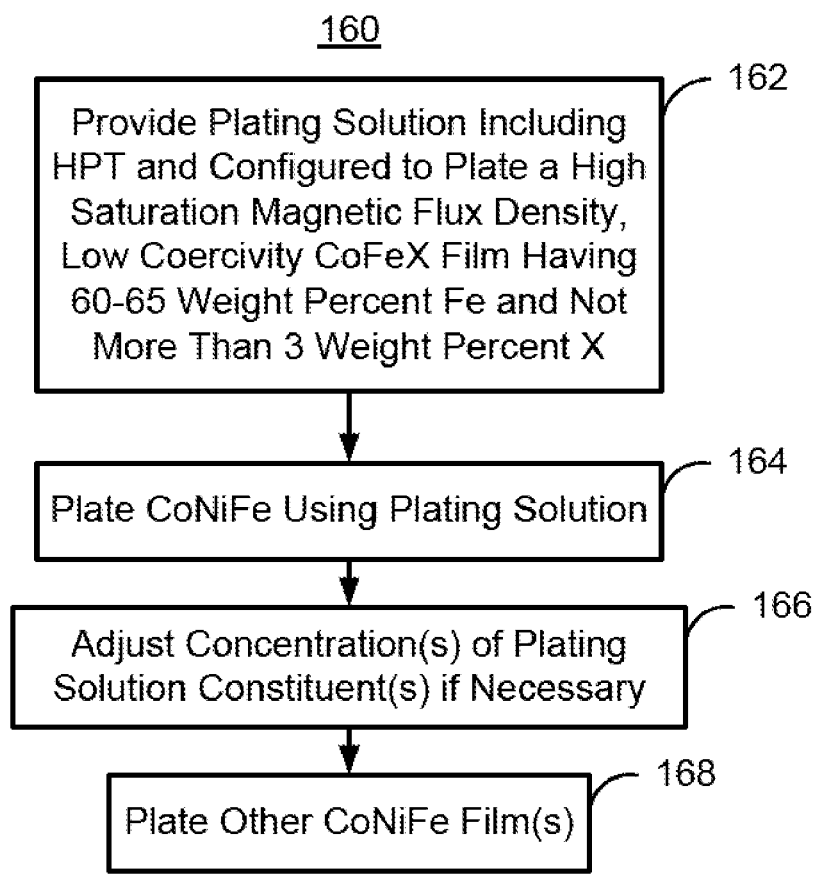
FIG. 5 is a flow chart depicting another exemplary embodiment of a method for providing a plated CoFeX film.

FIG. 5 is a flow chart of another exemplary embodiment of a method 160 for plating high $B_{sat}$, soft CoFe films. Thus, in the embodiment shown in FIG. 5, a CoFeX film where the concentration of X is zero (X is omitted) is fabricated. For simplicity, some steps may be omitted, combined, and/or interleaved. In addition, the steps of the method 160 may include substeps. The method 160 is also described in the context of providing a single film. However, the method 160 may be used to fabricate multiple films and/or a film for multiple transducers at substantially the same time. The method 160 may also be used in plating CoFe for other purposes.

An initial plating solution including HPT is provided, via step 112. The plating solution provided in step 162 is analogous to the plating solution provided using step 152 of the method 150. Thus, the plating solution is configured to plate a high $B_{sat}$, soft CoFe film that may also have a low $H_k$. Step 162 may include maintaining the plating solution at a pH of approximately 2.8 plus or minus 0.3 and a temperature of approximately eighteen degrees Celsius (i.e. room temperature). In other embodiments, the pH may vary more (e.g. from 2-3) and/or the temperature may be maintained at or near another temperature within another temperature range. Table 1 depicts one embodiment of the composition of the plating bath configured in step 162 and used for plating a CoFe film.

TABLE 1

| CHEMICALS | CONCENTRATION RANGE |
|---|---|
| $H_3BO_3$ (Boric Acid) | 0.4 mol/l |
| NaCl | 0.5 mol/l |
| $CoSO_4$-$7H_2O$ | 0.02-0.07 mol/l |
| $FeSO_4$-$7H_2O$ | 0.08-0.25 mol/l |
| Sodium Lauryl Sulfate | 0.01-0.1 g/l |
| HPT | 0.001-0.1 g/l |
| pH | 2-3 |

A CoFe film is plated on a substrate in the plating solution, via step 164. In a preferred embodiment, the CoFe film is being plated for a write head (not shown in FIG. 5). In such an embodiment, the substrate includes the structures under the first and/or second pole. Moreover, step 164 may be continued until the desired thickness of CoNiFe film is achieved.

The concentration of constituents in the plating solution is adjusted to maintain the plating of the CoFe film having the desired composition, the desired $B_{sat}$, and preferably the desired softness and $H_k$, via step 166. Thus, during plating and/or once film(s) have been plated in step 164, the plating solution is tuned so that the plating solution will still be configured to provide CoFe film(s) having the desired properties. For example, the pH of the solution may be adjusted by the addition of $H_2SO_4$. Other adjustments may also be made.

At least one more CoFe film is plated using the updated plating solution, via step 168. In some embodiments, the conditions under which the CoFe film is plated in step 168 are substantially the same as for the CoFe film plated in step 164. Consequently, multiple CoFe films in a device may have substantially the same properties. Step 168 may also include continuing plating the same CoFe film started in step 164. Thus, the desired thickness and/or number of CoFe films may be fabricated. Using the method 160, CoFe films having the desired composition, magnetic properties, and other properties can be obtained.

Figure 6:
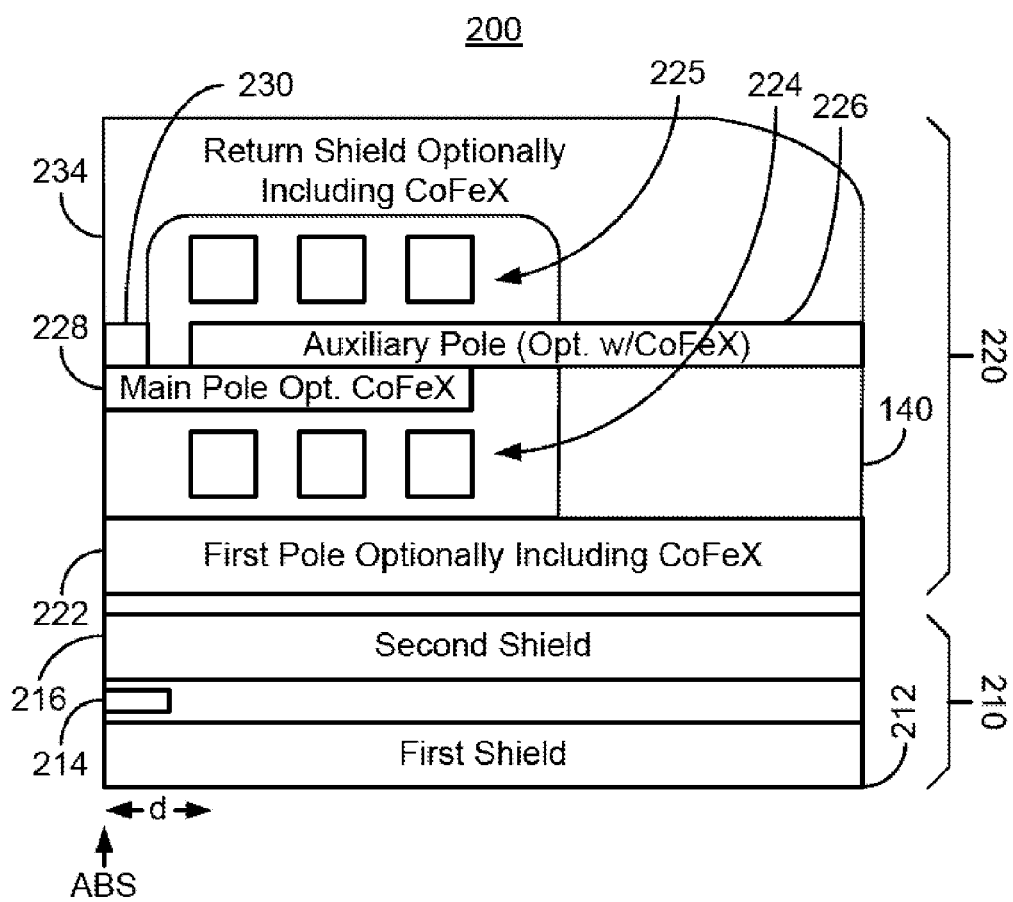
FIG. 6 is a diagram depicting one embodiment of a magnetic head utilizing a plated CoFeX film.

FIG. 6 depicts one embodiment of a write head 200 including CoFeX film(s) plated using method 150 and/or 160. For simplicity, components of the head 200 are omitted. In addition, for clarity, FIG. 6 is not to scale. The magnetic head 200 includes a magnetic read transducer 210 and write transducer 220. The head 200 is also described in the context of particular components and layers. However, in some embodiments, such layers may include sub-layer(s). In addition, some components may be moved, omitted, or combined with other components.

The read transducer 210 is used in reading from the media (not shown). The read transducer 210 includes shields 212 and 216 and sensor 214. The read sensor 214 may include a giant magnetoresistive sensor or a tunneling magnetoresistive junction. However, in other embodiments, the read sensor 214 may include other and/or additional components.

The write transducer 220 is used in writing to the media. The write transducer 220 is shown as including a first pole 222, auxiliary pole 226, main pole 228, write gap 230, coils 224 and 225, and return shield 234. However, in another embodiment, the write transducer 220 other and/or different components. For example, in other embodiments, the write transducer 220 may be an energy assisted magnetic recording (EAMR) transducer including optics for directing light energy toward a media for heating. In addition, one or more portions of the write transducer 220 might be omitted in various embodiments. The first pole 222 is shown as separate from shield 216. However, in another embodiment, the second shield 216 and first pole 222 may be combined.

In the head 200, At least a portion of the first pole 222, the main pole 228, the auxiliary pole 226, the return shield 234, the first shield 212 and/or the second shield 216 include CoFeX film(s) fabricated using the method 150 and/or 160. In some embodiments, only the main pole 228 includes the CoFeX film(s) formed using the method 150 and/or 160. In some embodiments, less than approximately one micron in thickness of the structures 212, 216, 222, 226, 228 and/or 234 includes the CoFeX film(s) described herein. However, in other embodiments, other thicknesses of the structures 212, 216, 222, 226, 228 and/or 234 may be fabricated using CoFeX film(s).

Because CoFeX films fabricated with the method 150 and/or 160 are used for the structure(s) 212, 216, 222, 226, 228 and/or 234, the structure(s) 212, 216, 222, 226, 228 and/or 234 exhibit desirable characteristics. In particular, the pole(s) 222, 226 and/or 228 may have improved $B_{sat}$, improved softness, and lower anisotropy fields. Consequently, performance of the write head 200 can be improved.

We claim:

1. A method for plating CoFeX, where X is an insertion metal comprising:
   providing a plating solution including hydroxymethyl-p-tolylsulfone (HPT), the plating solution being configured to provide a CoFeX film having a high saturation magnetic flux density of greater than 2.3 Tesla and not more than 3 weight percent of X; and plating the CoFeX film on a substrate in the plating solution, wherein plating solution further comprises $CoSO_4$, $FeSO_4$, NaCl, boric acid, and sodium lauryl sulfate.

2. The method of claim 1 wherein X includes at least one of Ni, Rh, Cr, Ru, Pt, Pd, and Mn.

3. The method of claim 1 wherein the step of configuring the plating solution further includes setting a pH of the plating solution to be at least 2 and not more than 3.

4. The method of claim 1 wherein the step of configuring the plating solution further includes setting a concentration of the HPT to be at least 0.001 and not more than 0.1 grams per liter.

5. The method of claim 4 wherein the concentration of HPT is at least 0.005 and not more than 0.025 grams per liter.

6. The method of claim 5 wherein the saturation magnetic flux density is at least 2.35 T.

7. The method of claim 6 wherein the saturation magnetic flux density is at least 2.4 T.

8. The method of claim 1 wherein the step of plating the CoFeX film further includes:
   plating the CoFeX film using a direct current.

9. The method of claim 1 wherein the step of plating the CoFeX film further includes:
   plating the CoFeX film using a pulsed current.

10. The method of claim 9 wherein the CoFeX film includes at least fifty-five and not more than eighty weight percent of Fe.

11. The method of claim 9 wherein the CoFeX film includes at least sixty and not more than sixty five weight percent Fe.

12. The method of claim 1 wherein the step of plating the CoFeX film further includes:
   terminating the plating when the CoFeX film has a thickness of at least 0.1 micron and not more than two microns.

13. The method of claim 1 wherein the CoFeX film as plated has a hard axis coercivity of less than or equal to two Oe and an easy axis coercivity of less than or equal to six Oe.

14. A method for providing a write head comprising:
   providing a plating solution including hydroxymethyl-p-tolylsulfone, $CoSO_4$, $FeSO_4$, NaCl, $H_3BO_3$, and sodium lauryl sulfate, the plating solution having a pH of not more than three and not less than two, the plating solution being configured to provide a CoFe film for a write pole having a high saturation magnetic flux density of greater than 2.35 Tesla, and having a composition of 60-65 weight percent of Fe; and plating the CoFe film for the write head on a substrate in the plating solution.

15. The method of claim 14 wherein the step of providing the plating solution further includes:
   maintaining the plating solution at a temperature of at least fifteen and not more than thirty-five degrees Celsius.

16. The method of claim 15 wherein the temperature is at least eighteen and not more than twenty-four degrees Celsius.

* * * * *